(12) United States Patent
Willers

(10) Patent No.: US 10,785,042 B2
(45) Date of Patent: Sep. 22, 2020

(54) ADJUSTABLE PHYSICAL UNCLONABLE FUNCTION

(71) Applicant: Robert Bosch GmbH, Stuttgart (DE)

(72) Inventor: Oliver Willers, Korb (DE)

(73) Assignee: Robert Bosch GmbH, Stuttgart (DE)

( * ) Notice: Subject to any disclaimer, the term of this patent is extended or adjusted under 35 U.S.C. 154(b) by 295 days.

(21) Appl. No.: 15/935,256

(22) Filed: Mar. 26, 2018

(65) Prior Publication Data
US 2018/0294981 A1    Oct. 11, 2018

(30) Foreign Application Priority Data

Apr. 5, 2017    (DE) .......................... 10 2017 205 818

(51) Int. Cl.
| | | |
|---|---|---|
| G06F 21/00 | (2013.01) | |
| H04L 9/32 | (2006.01) | |
| G06F 21/72 | (2013.01) | |
| B81B 7/00 | (2006.01) | |
| G06F 5/00 | (2006.01) | |
| G06F 21/73 | (2013.01) | |

(52) U.S. Cl.
CPC .......... *H04L 9/3278* (2013.01); *B81B 7/0012* (2013.01); *G06F 5/00* (2013.01); *G06F 21/72* (2013.01); *G06F 21/73* (2013.01)

(58) Field of Classification Search
CPC ..... H04L 9/3278; H04L 9/0866; G06F 21/73; G06F 5/00; G06F 21/72; B81B 7/0012
See application file for complete search history.

(56) References Cited

U.S. PATENT DOCUMENTS

| | | | |
|---|---|---|---|
| 8,334,757 B2* | 12/2012 | Guajardo Merchan | G06K 19/07309 235/375 |
| 8,667,265 B1* | 3/2014 | Hamlet | H04L 9/0866 326/80 |
| 8,918,647 B1* | 12/2014 | Wallrabenstein | H04L 9/3278 713/172 |
| 8,981,810 B1* | 3/2015 | Trimberger | H03K 19/003 326/15 |
| 9,497,312 B1* | 11/2016 | Johansson | H04L 63/0876 |
| 10,132,858 B2* | 11/2018 | Vanhoucke | G09C 1/00 |
| 10,256,983 B1* | 4/2019 | Bauer | H04L 9/3278 |
| 2008/0112596 A1* | 5/2008 | Rhoads | G06K 9/00456 382/115 |
| 2008/0141364 A1* | 6/2008 | Skoric | H04L 9/3234 726/20 |
| 2009/0132624 A1* | 5/2009 | Haselsteiner | H03K 3/84 708/255 |
| 2009/0327747 A1* | 12/2009 | Bruekers | G07C 9/257 713/189 |
| 2010/0031065 A1* | 2/2010 | Futa | H04L 9/0866 713/194 |
| 2010/0073147 A1* | 3/2010 | Guajardo Merchan | G06K 19/07309 340/10.51 |

(Continued)

*Primary Examiner* — David Garcia Cervetti
(74) *Attorney, Agent, or Firm* — Norton Rose Fulbright US LLP; Gerard Messina

(57) ABSTRACT

An assembly made up of a micro-electro-mechanical system as physical unclonable function, which in reaction to a challenge, outputs a response in accordance with a mapping rule, and a controllable control element which is equipped, in accordance with a control command, to adjust an ambient parameter influencing the mapping rule.

14 Claims, 1 Drawing Sheet

(56) References Cited

U.S. PATENT DOCUMENTS

| | | | |
|---|---|---|---|
| 2010/0146261 A1* | 6/2010 | Talstra | H04L 67/12 713/155 |
| 2010/0177898 A1* | 7/2010 | Tuyls | H04L 9/3278 380/270 |
| 2011/0002461 A1* | 1/2011 | Erhart | G06F 21/34 380/44 |
| 2011/0191837 A1* | 8/2011 | Guajardo Merchan | H04L 9/0866 726/6 |
| 2011/0215829 A1* | 9/2011 | Guajardo Merchan | H01L 23/544 326/8 |
| 2012/0030270 A1* | 2/2012 | Shokrollahi | H04L 9/3278 708/802 |
| 2013/0047209 A1* | 2/2013 | Satoh | G09C 1/00 726/2 |
| 2013/0133031 A1* | 5/2013 | Fainstein | G06F 21/73 726/2 |
| 2014/0108786 A1* | 4/2014 | Kreft | H04L 63/0428 713/156 |
| 2014/0376717 A1* | 12/2014 | Macchetti | H04L 9/14 380/28 |
| 2015/0071432 A1* | 3/2015 | Zhu | G11C 11/161 380/28 |
| 2015/0200775 A1* | 7/2015 | Guajardo Merchan | H04L 9/0866 380/28 |
| 2015/0295722 A1* | 10/2015 | Falk | H04L 9/3278 380/44 |
| 2016/0148664 A1* | 5/2016 | Katoh | G06F 21/72 365/148 |
| 2016/0148679 A1* | 5/2016 | Yoshimoto | G11C 13/0059 365/148 |
| 2016/0148680 A1* | 5/2016 | Yoshimoto | G11C 13/004 365/148 |
| 2016/0149702 A1* | 5/2016 | Fischer | H04L 9/0866 380/44 |
| 2016/0170907 A1* | 6/2016 | Walsh | G06F 21/44 713/193 |
| 2016/0269186 A1* | 9/2016 | Wallrabenstein | G06F 21/31 |
| 2016/0373264 A1* | 12/2016 | Katoh | H01L 45/1233 |
| 2017/0063559 A1* | 3/2017 | Wallrabenstein | H04L 9/085 |
| 2017/0141929 A1* | 5/2017 | Afghah | H04L 9/3278 |
| 2017/0149572 A1* | 5/2017 | Wallrabenstein | G06F 21/34 |
| 2017/0242660 A1* | 8/2017 | Katoh | H04L 9/003 |
| 2017/0277457 A1* | 9/2017 | Lu | G06F 3/0673 |
| 2017/0329954 A1* | 11/2017 | Lao | G06F 21/44 |
| 2017/0344761 A1* | 11/2017 | Jennings | G09C 1/00 |
| 2017/0345116 A1* | 11/2017 | Katoh | G06T 1/0028 |
| 2017/0364709 A1* | 12/2017 | Plusquellic | G06F 21/604 |
| 2018/0102907 A1* | 4/2018 | Lin | G06F 21/44 |
| 2018/0150389 A1* | 5/2018 | Bhargava | H04L 9/0891 |
| 2018/0183613 A1* | 6/2018 | Dafali | H04L 9/3278 |
| 2018/0191512 A1* | 7/2018 | Tomishima | G06F 21/72 |
| 2018/0329962 A1* | 11/2018 | Schrijen | G09C 1/00 |
| 2020/0076622 A1* | 3/2020 | Best | H04L 9/0866 |

* cited by examiner

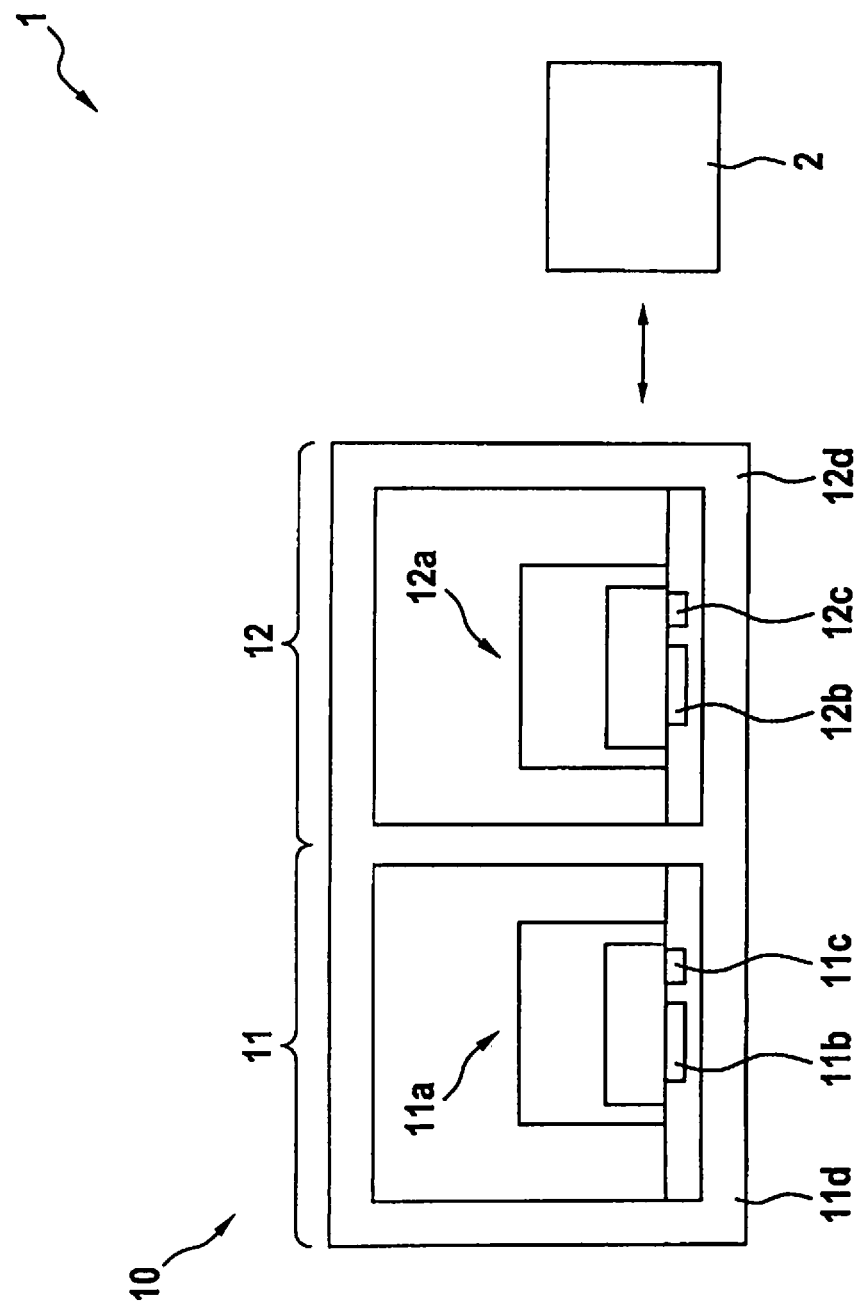

ADJUSTABLE PHYSICAL UNCLONABLE FUNCTION

CROSS REFERENCE

The present application claims the benefit under 35 U.S.C. § 119 of German Patent Application No. DE 102017205818.8 filed on Apr. 5, 2017, which is expressly incorporated herein by reference in its entirety.

FIELD

The present invention relates to an assembly having a micro-electro-mechanical system as physical unclonable function.

BACKGROUND INFORMATION

What are referred to as physical unclonable functions (PUF) are physical entities which map a challenge to a response with the aid of a mapping rule, the mapping rule being based on physical characteristics of the entity. Among other things, a PUF evaluates production fluctuations of the entity, and from that, generates an individual response. This individual response varies between different entities, and may therefore be used to identify the entity and/or to generate (cryptographic) keys.

Examples for PUFs are silicon physical random functions (SPUF), which evaluate variations in the delay of transistors and lines in integrated circuits, in order to identify the chip. Arbiter PUFs use an arbiter (e.g., a D flip-flop) to recognize differences in two identical delay paths. In a coating PUF, local resistances of a coating of an integrated circuit are detected and evaluated in order to identify the chip.

U.S. Patent Application Pub. No. 2015/0200775 A1 describes PUFs based on micro-electro-mechanical systems (MEMS).

With the aid of a PUF, cryptographic keys may be generated for the encryption of data or for the safe exchange of data, or more precisely, for secure communication between different arithmetic logic units. An advantage of a key generated from a PUF is, in particular, that it does not have to be stored—storing being vulnerable in terms of security—but rather may be generated as needed by implementing the PUF. This is especially advantageous for situations in which a multitude of entities of identical construction must be individualized like, for example, in data transmission. A current example is what is referred to as the "Internet of Things" (IoT).

SUMMARY

The present invention provides an assembly made up of a micro-electro-mechanical system as physical unclonable function and a controllable control element for altering the mapping rule of the function; a packaged unit made up of a plurality of such assemblies; and a system made up of at least one such assembly and a control unit having the features set forth in the independent claims. Advantageous refinements are described herein.

The present invention is based on the measure of employing an MEMS as PUF and, in this context, altering the mapping rule between challenge and response with the aid of a suitable controllable control element. Thus, by altering the driving of the control element, different responses may be generated to the same challenge.

As described, for example, in U.S. Patent Application Pub. No. 2015/0200775 A1 cited in the introduction, micro-electro-mechanical systems may be used as PUFs, the mapping rule being based on mechanical and/or electrical properties like, for instance, a resonant frequency, stiffness of a spring constant relative to the resonant frequency, a capacitance of the system or a change in capacitance caused by change in shape, an enabling voltage, a difference between pull-in voltages, a resistance, an inductance and so forth. These mechanical and/or electrical properties are influenced by ambient parameters like, in particular, temperature and pressure, so that these properties and consequently the mapping rule are likewise able to be altered by a selective change of the ambient parameters, especially by a heating element and/or cooling element as control element.

This also solves the problem of conventional PUFs, which normally are only able to generate a few different, usually only one, response to a challenge. As a result, with the design approach according to the present invention—if needed—notably, a plurality of different cryptographic keys may also be generated from the different responses. This permits a reconfiguration of cryptographic keys, which increases the value of the PUF. Depending on the form of the control element, it may also be used advantageously to destroy the PUF, for example, by great heat. In this way, the read-out of encrypted information may be prevented permanently. Another advantageous possibility for destroying micro-electro-mechanical systems lies in the use of what are referred to as pull-in effects. In that case, a voltage is applied to adjacent conductive structures (electrodes) which is so high that due to electrostatic attraction, they attract each other and touch, which leads to destruction of the micro-electro-mechanical structure.

Preferably, an assembly according to the present invention is used to generate a unique response, from which an identification feature and/or a cryptographic key is/are then generated. A system according to the present invention, e.g., in the form of a System-on-a-Chip (SoC), has at least one assembly according to the present invention and a control unit which is equipped to generate the control command for the control element. This represents a means for attaining the objective that is ready for use in a wide variety of application cases, especially for use for cryptography and/or in network-capable devices.

By preference, the entire assembly is disposed in a packaging which preferably is formed of a ceramic material like silicon dioxide, for example. In this way, influencing of the mapping rule by external disturbances, e.g., also in the form of adjacent assemblies, may be reduced or completely avoided. Advantageously, it is possible to produce the structure using a normal MEMS process. Here, usually two silicon wafers are used, one which provides the functional structure, as well as a cap wafer which at the end, closes the cavity in a defined state. The generation of a layer on/in the Si wafers for the thermal insulation may, in this case, be interposed as additional process step. Nevertheless, it remains a classic MEMS process, whose basis represents Si technology.

Advantageously, the assembly also has a measuring element for measuring the ambient parameter influencing the mapping rule like, for example, temperature and/or pressure. Notably, a measurement of the ambient parameter may be used for controlling it in closed loop. In this way, the ambient parameter may be adjusted in particularly precise manner. In principle, however, it is also possible and envisaged, especially in the case of packaged units made up of a plurality of assemblies according to the invention, to in each case adjust the ambient parameter along the lines of a pure open-loop control (that is, without feedback of the measured value) and to evaluate the responses based on a comparison or relationship with one another. In this manner, disturbances which act equally on the plurality of assemblies like, for example, an ambient temperature and/or an ambient pressure, may be eliminated.

Further advantages and refinements of the present invention are described herein and are shown in the FIGURE.

The present invention is represented schematically in the FIGURE on the basis of an exemplary embodiment, and is described below with reference to the FIGURE.

BRIEF DESCRIPTION OF THE DRAWING

FIG. 1 shows a sectional view of a preferred specific embodiment of a system according to the present invention, having two assemblies and one control unit.

DETAILED DESCRIPTION OF EXAMPLE EMBODIMENTS

In FIG. 1, a system according to a preferred specific embodiment of the present invention is represented schematically in a sectional view and is designated by 1. System 1 has a packaged unit 10 made up of two assemblies 11, 12, and a control unit 2. Control unit 2 is connected to packaged unit 10 in a manner permitting the transmission of signals.

Each of assemblies 11, 12 has a micro-electro-mechanical system (MEMS) 11a, 12a as physical unclonable function (PUF), a control element taking the form here of heating element 11b, 12b, and according to the preferred specific embodiment of the invention shown, also a measuring element taking the form here of temperature sensor 11c, 12c. In addition, it has a packaging 11d, 12d made of silicon dioxide, which is formed contiguously in the example shown.

PUF 11a, 12a is set up to map a challenge to a response according to a mapping rule based on mechanical and/or electrical properties of the MEMS. For example, the mechanical property may include a resonant frequency or a spring constant; the electrical property may include a capacitance, inductance and/or electrical resistance, for instance. However, it should be emphasized that this is to be understood only by way of example and not definitively, reference being made to U.S. Patent Application Pub. No. 2015/0200775 A1 described above with regard to further details.

In particular, control unit 2 is equipped to act upon assemblies 11, 12 with the challenge, especially in the form of a challenge signal, and to detect the response, especially in the form of a response signal.

The mechanical and/or electrical properties of the MEMS are a function of different ambient parameters like, in particular, ambient temperature and/or ambient pressure. Within the framework of the preferred specific embodiment of the invention, it is now provided that one or more of these ambient parameters, here, for example, the ambient temperature, is/are influenced or adjusted with the aid of the control element formed here as heating element. Temperature sensor 11c, 12c already indicated is provided for a closed-loop control of the temperature. Preferably, control unit 2 is thus set up to regulate the temperature within packaging 11d, 12d to a setpoint value, to thereby alter the respective mapping rule of PUF 11a, 12a.

Packaging 11d, 12d is used essentially to prevent external disturbances in the system, but also to prevent mutual influencing of adjacent assemblies 11, 12.

The use of such assemblies 11, 12 or such systems 1 is particularly advantageous, since the adjustable PUFs may be used, with the aid of suitable adjustment of the ambient parameter, to generate different responses for the same challenge. These different responses may then be used especially to generate different cryptographic keys, which markedly increases the application possibilities of the invention in comparison to conventional systems which, e.g., are able to supply only one response.

According to one preferred specific embodiment of the present invention, a destruction of PUF 11a, 12a is also possible, particularly utilizing what is referred to as the pull-in effect and/or by use of the control element, for example, by way of a suitably high temperature. The destruction of a PUF corresponds to an irreversible erasure, for example, of all cryptographic keys attained from it. If a cryptographic key is erased, data encrypted with this key can also no longer be decrypted. Thus, it is possible to safely erase large volumes of data quickly and easily.

What is claimed is:

1. An assembly, comprising:
   a micro-electro-mechanical system which, in reaction to a challenge, outputs a response in accordance with a mapping rule, wherein the micro-electro-mechanical system is a physical unclonable function;
   a controllable heating element which is configured to, in accordance with a control command, adjust an ambient temperature influencing the mapping rule, wherein the mapping rule is a function of mechanical and/or electrical properties of the micro-electro-mechanical system, and the mechanical and/or electrical properties of the micro-electro-mechanical system are a function of the ambient temperature; and
   a temperature sensor configured to measure the ambient temperature;
   wherein the micro-electro-mechanical system, the controllable heating element, and the temperature sensor are packaged together in a single package.

2. The assembly as recited in claim 1, wherein the single package is formed of a ceramic material, the single package surrounding the assembly formed by the micro-electro-mechanical system, the controllable heating element, and the temperature sensor.

3. The assembly as recited in claim 1, wherein the single package completely surrounds the micro-electro-mechanical system, the controllable heating element, and the temperature sensor.

4. The assembly as recited in claim 3, wherein the single package is formed of a ceramic material.

5. A packaged unit, comprising:
   a plurality of assemblies, each of the plurality of assemblies including a micro-electro-mechanical system, which, in reaction to a challenge, outputs a response in accordance with a mapping rule, wherein the micro-electro-mechanical system is a physical unclonable function, wherein each of the plurality of assemblies further includes a controllable heating element which is configured to, in accordance with a control command, adjust an ambient temperature influencing the mapping rule, wherein the mapping rule is a function of mechanical and/or electrical properties of the micro-electro-mechanical system, and the mechanical and/or electrical properties of the micro-electro-mechanical system are a function of the ambient temperature, and wherein each of the plurality of assemblies further includes a temperature sensor configured to measure the ambient temperature;

wherein the plurality of assemblies are packaged together in a single package.

6. The packaged unit as recited in claim 5, wherein the single package completely surrounds the plurality of assemblies.

7. The packaged unit as recited in claim 6, wherein the single package is formed of a ceramic material.

8. A system, comprising:

at least one assembly, each of which includes a micro-electro-mechanical system which, in reaction to a challenge, outputs a response in accordance with a mapping rule, wherein the micro-electro-mechanical system is a physical unclonable function wherein each of the at least one assembly further includes a controllable heating element which is configured to, in accordance with a control command, adjust an ambient temperature influencing the mapping rule, wherein the mapping rule is a function of mechanical and/or electrical properties of the micro-electro-mechanical system, and the mechanical and/or electrical properties of the micro-electro-mechanical system are a function of the ambient temperature, and wherein each of the at least one assembly further includes a temperature sensor configured to measure the ambient temperature, wherein the at least one assembly is packaged together in a single package; and a control unit which is equipped to generate the control command for the control heating element.

9. The system as recited in claim 8, wherein the at least one assembly is disposed in a packaging made of a ceramic material, and wherein the control unit is equipped to regulate the ambient temperature.

10. The system as recited in claim 8, wherein the control unit is equipped to act upon the assembly with the challenge and to detect the response from the assembly.

11. The system as recited in claim 8, wherein the single package completely surrounds the at least one assembly.

12. The system as recited in claim 11, wherein the single package is formed of a ceramic material.

13. The system as recited in claim 8, wherein the control unit is configured to regulate the ambient temperature to a setpoint value.

14. The system as recited in claim 8, wherein the control unit is configured to regulate the ambient temperature to a setpoint value using the heating element and the temperature sensor.

* * * * *